United States Patent [19]

Tran et al.

[11] Patent Number: 5,450,257
[45] Date of Patent: Sep. 12, 1995

[54] HEAD-TAPE ALIGNMENT SYSTEM AND METHOD

[75] Inventors: Hung T. Tran, Woodbury; James S. Anderson, Chanhassen; Christopher L. Hill, St. Paul; Durkee B. Richards, Stillwater; Robert J. Youngquist, White Bear Lake, all of Minn.

[73] Assignee: Minnesota Mining and Manufacturing Company, St. Paul, Minn.

[21] Appl. No.: 35,783

[22] Filed: Mar. 23, 1993

[51] Int. Cl.⁶ .................. G11B 20/20; G11B 21/10
[52] U.S. Cl. ......................... 360/76; 360/77.12
[58] Field of Search ............. 360/77.12, 77.01, 76, 360/75

[56] References Cited

U.S. PATENT DOCUMENTS

| | | | |
|---|---|---|---|
| 2,937,239 | 5/1960 | Garber, Jr. et al. | 360/76 |
| 2,938,962 | 5/1960 | Konins et al. | 360/76 |
| 3,292,168 | 12/1966 | Gray | 340/174.1 |
| 3,526,726 | 9/1970 | Corbett et al. | 360/76 |
| 3,541,270 | 11/1970 | Walther | 179/100.2 |
| 4,392,163 | 7/1983 | Rijckaert et al. | 360/76 |
| 4,750,067 | 6/1988 | Gerfast | 360/106 |
| 4,866,548 | 9/1989 | Rudi | 360/77.02 |
| 4,953,161 | 8/1990 | Toyama | 360/77.12 |
| 5,001,580 | 3/1991 | Aranovsky et al. | 360/77.120 |
| 5,191,492 | 3/1993 | Nayak et al. | 360/77.12 X |
| 5,229,895 | 7/1993 | Schwartz et al. | 360/77.12 |
| 5,307,217 | 4/1994 | Saliba | 360/76 |

OTHER PUBLICATIONS

IBM Technical Disclosure Bulletin, vol. 17, No. 1, 1974 (T. A. Schwarz).
QIC Development Standard for "Serial Recorded Magnetic Tape Minicartridge for Information Interchange," (QIC-2000), Rev. B, 1991.
QIC Development Standard for "Serial Recorded Magnetic Tape Cartridge for Information Interchange," (QIC-10GB(C)), Rev. A1, 1992.

*Primary Examiner*—Andrew L. Sniezek
*Assistant Examiner*—James L. Habermehl
*Attorney, Agent, or Firm*—Gary L. Griswold; Walter N. Kirn; Charles L. Dennis, II

[57] ABSTRACT

A head-track orienting system for use in magnetic recording tape drives is disclosed which automatically corrects for misalignment between the head assembly and a recorded servo track on the tape. Using a servo control loop, the system calculates head-track alignment error during operation of the tape drive and either pivots the head assembly or adjusts the tape cartridge to compensate for the error. Transverse head-track positioning mechanisms are also included in the system to locate and maintain a centered position of the heads on the servo track.

24 Claims, 4 Drawing Sheets

HEAD-TAPE ALIGNMENT SYSTEM AND METHOD

TECHNICAL FIELD

The present invention relates to magnetic recording tape drives, and more particularly to a system for correcting alignment errors between a head of a magnetic recording system and a track on a magnetic recording tape.

BACKGROUND OF THE INVENTION

Conventional head assemblies for magnetic tape drives comprise separate heads for recording (writing) and playback (reading). Many assemblies employ a combination of write and read heads for a given channel arranged so that all of the heads can be aligned with a selected track on a magnetic recording tape. For example, a "read write read" head assembly may have three heads positioned along a common line so that a write head is positioned between two read heads. This configuration allows the head assembly to perform a "read after write" operation in which the read head following the write head verifies the integrity of the just-written data for either a forward or reverse direction of tape travel.

In state of the art high areal density recording, track pitch is extremely small. If either the head or the tape is even slightly misaligned with respect to the reference plane of the tape drive, the read head may pick up only a partial signal from the just-written track, or may even begin reading the signal from the next adjacent track. This off-track position may give rise to a very large perceived error rate during a read after write operation even if the actual recording was error-free.

Head-track misalignment has been previously addressed in a number of ways. For instance, mechanical tolerances on data cartridge construction may be tightened and initial alignment of the head/actuator assembly may be finely adjusted. With the advent of high density magnetic tapes, however, track widths have decreased to the point where incorporating the necessary mechanical precision into every drive and every cartridge becomes impractical and prohibitively expensive. Even when the cartridge and drive are manufactured according to close specifications, head-track misalignment may still occur. For example, error may result from the biasing or skewing of tape which travels at high speeds under tension in a data cartridge. This type of error is especially apparent when a new track is written on the tape or data is overwritten onto an existing track. When the existing track was created by a different drive from the one in use, the opportunity for error is even greater.

Though improper tape alignment with respect to the reference plane is, in theory, a separate circumstance from improper head alignment, in practice they produce common misalignment effects.

Automatic techniques for reducing or compensating for these effects are known in the magnetic recording industry. For example, instrument recorders having a fixed, multitrack head assembly have previously employed a servo control method to compensate for head alignment error occurring as a magnetic tape is wound from reel-to-reel in the recorder. Automatic rotational adjustment of the head was controlled using timing signals generated from two pre-recorded information tracks spaced apart so as to be played back by the two outermost heads of the multitrack assembly. This technique was used to correct timing skew between tracks being read simultaneously across the width of the media.

Methods for correcting head position using transverse adjustment of the head assembly are also known for single track head assemblies. For example, U.S. Pat. No. 5,001,580 (Aranovsky et al.) reviews the geometry of head-track alignment errors and methods of compensation which have been incorporated into several previous magnetic recording systems. The method disclosed in that patent pertains to a recording system having a three channel head assembly with a write head and two read heads arranged along a common line, nominally parallel to the tape transport path. Each read head is positioned so as to sequentially read a pre-recorded data pattern oriented at a known slope with respect to the tape centerline. The angular offset between the common line of the two read heads and the centerline of the tape is then calculated based on timing signals derived from the read heads. Those signals enable a transverse adjustment of the head assembly to be made via a stepping process to position one of the two read heads over the track center for either forward or reverse reading. The offset calculation is performed once for a particular tape drive and can be saved within the drive for future adjustments.

IBM Technical Disclosure Bulletin, V. 17, No. 1, 1974 (Schwarz), describes a method for correcting the position of a head assembly comprising one write head and one read head. The method uses a small pre-recorded test sector within each track on a magnetic tape. Both heads, operated in a read mode, generate separate signals from the test sector on one track. The magnitude of the difference between the signals is indicative of the displacement between the two heads with respect to the track. The data is stored digitally and can be recalled to adjust the head assembly transversely so that the read head is centered over the track.

Various mechanisms are also known for controlling the transverse position of the head assembly with respect to a magnetic tape (also known as track finding). For example, U.S. Pat. No. 4,750,067 (Gerfast) discloses a head positioning mechanism for a multitrack data cartridge recorder. The mechanism utilizes a stepper motor to move the head incrementally across the width of a magnetic tape having a plurality of parallel tracks so as to locate the head over a selected track.

The QIC-3GB and QIC-10GB Development Standards further propose the use of a pre-recorded track on the tape and a servo loop mechanism in the drive to minimize the effects of the many sources of head-track error. Both read heads are used in a servo loop to provide transverse head position control.

SUMMARY OF THE INVENTION

The narrow track dimensions characteristic of high density magnetic tapes and the demand for magnetic recording system reliability dictate increasingly precise head-track alignment methods. In a state-of-the-art magnetic recording system where the tape travels at up to 305 cm/sec (120 in/sec) and track pitch may be only 0.034 mm (1.34 mils), it is all too easy for multichannel head assemblies to become slightly misaligned, leading to weakened signals or signal contamination. Factory adjustment of the head assembly with respect to the drive reference plane takes care of only one possible source of alignment error. Individual tape cartridges also differ in alignment with the reference plane; the differences are no longer sufficiently controlled by the rigid base plate in the cartridge. Most challenging to correct is error which arises during actual cartridge operation as the tape travels at high speed under tension.

Existing compensation methods rely only on transverse adjustment of the head assembly across the width of the tape. Because misalignment typically occurs when a head or tape is skewed with respect to the reference plane, it has now been found that a rotational or pivotal response will more effectively locate all heads of a given channel in a multichannel assembly simultaneously over the same track. Furthermore, a method for automatically calculating and minimizing head-track alignment error during the operation of a tape drive is desirable.

The invention presented here is a head-track orienting assembly for use in magnetic recording tape drives in which a mechanism is provided for orienting a multichannel head assembly with respect to a servo track recorded on a magnetic tape to correct for head and tape alignment error simultaneously. The head assembly includes at least two read heads arranged along a common line for a given channel, such that each head is able to generate a signal simultaneously from the same recorded servo track which is characteristic of the transverse position of each head relative to the servo track. From these two signals are computed position error signals which are then used to produce a head-track alignment error signal for controlling the orienting mechanism.

In the preferred embodiment, the head assembly is oriented using a pivoting mechanism. Specifically, a base supporting the magnetic head assembly is controllably displaced by a stepper motor and lead screw. The support base is rotatably fixed to the drive chassis using a hinging mechanism, so that the base is constrained from motion except for rotation about the axis of the hinge. As a result of displacement by the stepper motor, the support base and the head assembly mounted on the base pivot slightly about an axis substantially perpendicular to the plane of the tape.

In other embodiments, the alignment mechanism may be located on another portion of the drive assembly in a way that results in the same pivotal orientation of the head assembly. Alternatively, the head assembly may remain fixed while the tape cartridge containing the tape is adjusted during operation in the drive. In one embodiment, the cartridge is tilted by a controlled displacement mechanism such as a stepper motor so as to orient the tape with respect to the head assembly. More preferably, the cartridge may be locked onto a receiving plate mounted within the drive. The receiving plate, with the cartridge mounted on it, is then controllably displaced.

In a further aspect of the preferred embodiment, the head-track orienting assembly is included in a closed servo loop system for continuous, automatic head-track alignment control. The system includes a means for computing two position error signals from the signals generated by the read heads and a head-track alignment error signal based on the two position error signals. The system also includes a driver which responds to the head-track alignment error signal, and a displacement transducer powered by the driver to make pivotal adjustments to the head assembly about an axis substantially perpendicular to the plane of the tape. The objective of the control loop is to minimize the head-track alignment error signal, thereby reducing the combined misalignment error of tape and head to essentially zero.

The preferred system also provides servo control loops for coarse and fine positioning of the head assembly transversely with respect to the tape using a head-track position error signal computed from the two position error signals. By minimizing the head-track position error signal, the common line of the read heads is brought substantially to the center of the servo track. Head-track positioning control contributes to the proper function of the invention because pivotal adjustments made to the head assembly for head-track alignment may tend to move the common line away from the center of the servo track.

Through the closed loop control aspect of the invention, the system assesses the head alignment and position with respect to the tape during operation of the drive. The system provides automatic pivotal and translational adjustment of a multichannel assembly so that all heads of a given channel are centered on the servo track at the same time, resulting in the best possible performance and reliability with each cartridge used in the drive.

DETAILED DESCRIPTION

For the purposes of this invention, a servo track is defined as any track on a magnetic tape containing a prerecorded pattern from which a position error signal may be derived.

Head-track positioning is defined as bringing the common line of the heads in a given channel of a multichannel head assembly substantially to the center of the servo track which the heads are reading. Head-track positioning implies translational motion of the head assembly a certain distance across the width of a magnetic tape.

Coarse head-track positioning involves moving the head assembly a distance on the order of 1/10 of the width of a single track, while fine head-track positioning involves moving the head assembly a distance of less than approximately 1/100 of the width of a single track.

Head-track alignment is defined as adjusting the common line along which the heads are positioned to be substantially parallel to the servo track, although the common line may be located away from the track center. Rotational motion of the head assembly is associated with head-track alignment.

Figure 1:
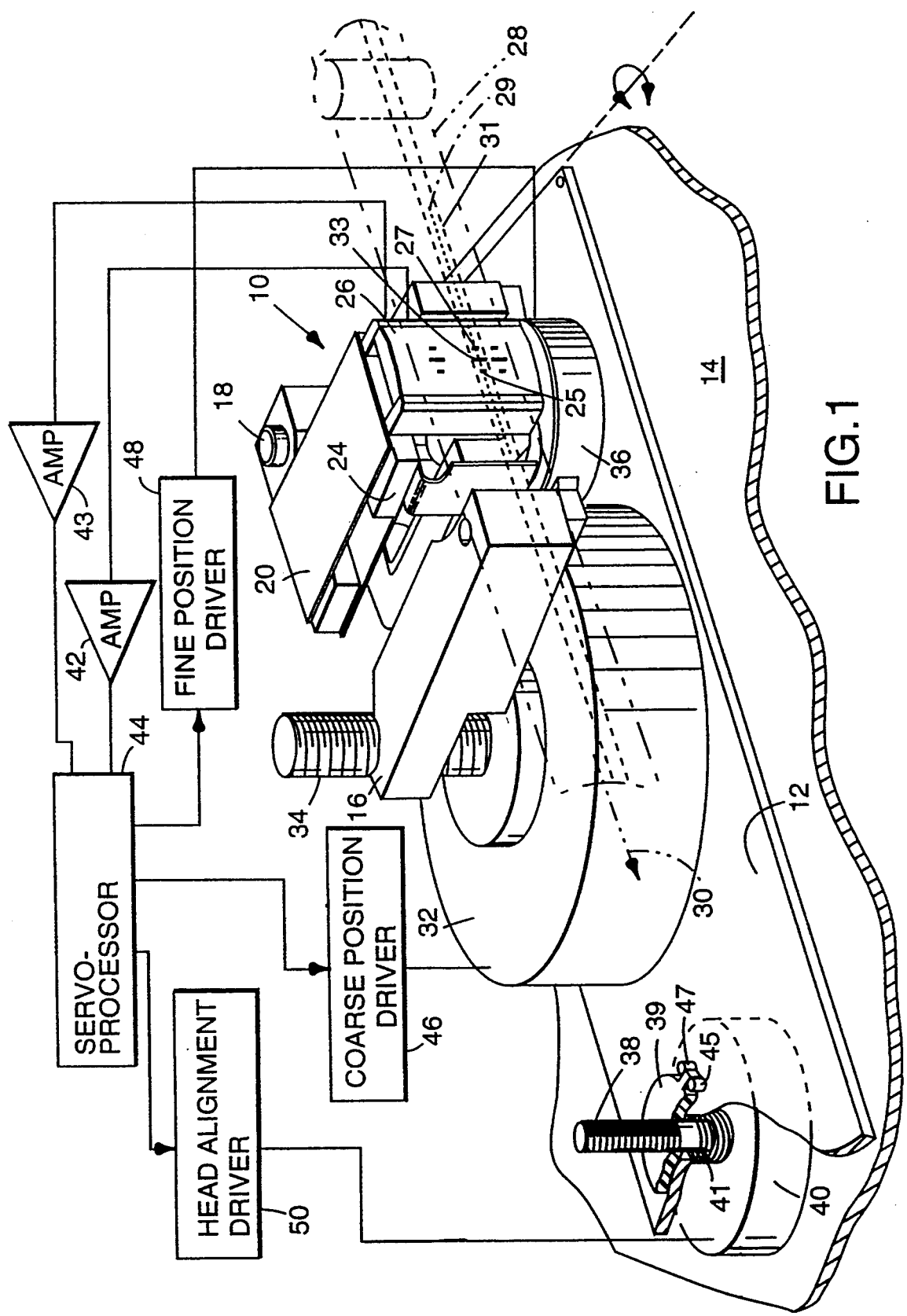
FIG. 1 is a combined isometric view of head alignment and positioning mechanisms and a block diagram of a closed loop servo control system according to one embodiment of the present invention.

FIG. 1 shows a combined electromechanical and block diagram of the preferred embodiment of a head-track orienting system for a magnetic recording tape drive as used in the present invention.

A key component of the system is a head-track orienting assembly 10 which provides mechanisms for coarse and fine head-track positioning and head-track alignment. The assembly 10 includes a support base 12 having a first end rotatably fixed to a drive chassis 14 using a pair of ball hinges or another alternative hinging method known in the art. The support base is thereby restrained from motion except for rotation about the axis of the hinge. The support base may alternatively be rotatably fixed at some other position on the support base, as long as the axis of rotation is positioned to be substantially perpendicular to the plane of magnetic tape 28. A head mounting slide 16 is slidably mounted on a cylindrical shaft 18 extending from support base 12.

The head mounting slide 16 further includes first and second cantilevered leaf springs, of which only first spring 20 is shown. The leaf springs are arranged parallel to each other and are vertically spaced apart by a distance appropriate to engage a head mounting member 24 in a direction substantially perpendicular to the surface of support base 12 while minimizing rotation or movement of the head mounting member in other directions.

A magnetic head assembly 26, which includes a plurality of channels with at least two read heads 25,27 positioned on either side of a write head 33 along a common line 29 for a given channel, is rigidly mounted to head mounting member 24. The read heads operate to read a recorded servo track 31 on a magnetic tape 28 (shown in phantom view) which follows a transport path 30. The servo track is utilized to supply signals for the coarse and fine head-track positioning and the head-track alignment control mechanisms which will be described subsequently.

For coarse head-track positioning, a stepper motor 32 is mounted on support base 12 and drives a lead screw 34. Lead screw 34 engages head mounting slide 16 so that the head mounting slide and attached magnetic head assembly are moved in a transverse direction substantially perpendicular to the servo track.

For fine head-track positioning, a voice coil motor assembly 36 is attached at a first end to head mounting member 24 at a point along a line (not shown) whose axis advantageously may intersect the center of mass of the combined head mounting member and magnetic head assembly 26 in the transverse direction of movement. The location of the voice coil motor assembly and the leaf springs make small translational adjustments of magnetic head assembly 26 possible.

For head-track alignment, a stepper motor 40 is mounted on drive chassis 14. A lead screw 38 extends from the stepper motor through an aperture in a second end of the support base separated by a distance from the first hinged end. A threaded shaft follower 39 is coupled to the lead screw on the opposite side of the support base from stepper motor 40. The shaft follower is substantially attached to the support base due to force exerted by a spring 41 or other similar bias means fixed between the stepper motor and the support base. Shaft follower 39 is constrained from rotating by pins 45,47 attached to support base 12. The use of pins is not a crucial feature of the invention; other known means of constraint may be used instead.

The step angle of the stepper motor, the pitch of the lead screw and the distance between the stepper motor and the support base hinge location can be chosen such that the action of the stepper motor causes a specified change in displacement angle between support base 12 and drive chassis 14. The angular change is preferably 30 seconds of arc per step. Other displacement transducers known in the art may be used in place of the stepper motor to provide controlled displacement of the support base, such as a piezoelectric crystal, a voice coil motor, or the like. To provide servo loop control, a pair of amplifiers 42,43 are coupled to magnetic head assembly 26. A programmed servo processor 44, coupled to the amplifiers, computes error signals and directs drive instructions to a coarse position driver 46, a fine position driver 48, and a head alignment driver 50. These drivers respond to the processor signals by driving stepper motor 32, voice coil motor assembly 36, and stepper motor 40, respectively.

Still referring to FIG. 1, the head-track orienting system operates automatically to control coarse and fine head-track positioning and head-track alignment relative to servo track 31 on magnetic tape 28. Magnetic head assembly 26 is positioned so that the read heads for one channel are reading the servo track. Two signals are generated by the read heads which are characteristic of the transverse position of each head relative to the servo track. The two heads are able to generate separate signals simultaneously. The signals pass through amplifiers 42,43 and are presented to servo processor 44 where a first and a second position error signal are computed. The magnitude of the position error signals indicates the degree to which each read head deviates from the center of the servo track.

For head-track positioning, a head-track position error signal is computed preferably as the mean of the two position error signals, although it may alternatively be taken as either of the two position error signals individually. From the head-track position error signal, the servo processor computes drive instructions which are sent to coarse position driver 46 and fine position driver 48 for head-track positioning adjustments.

Stepper motor 32 is adapted to respond to the coarse position driver to rotate lead screw 34 incrementally. The action of the lead screw slides the head mounting slide on the cylindrical shaft, thus stepping head mounting member 24 and attached magnetic head assembly 26 transversely with respect to servo track 31.

Voice coil motor assembly 36 is adapted to respond to the fine position driver to induce small transverse movements of the magnetic head assembly on the cantilevered leaf springs.

The objective of the head-track positioning control loop is to minimize the head-track position error signal, thereby indicating that the common line of the read heads has been brought substantially to the center of the servo track.

Figure 2:
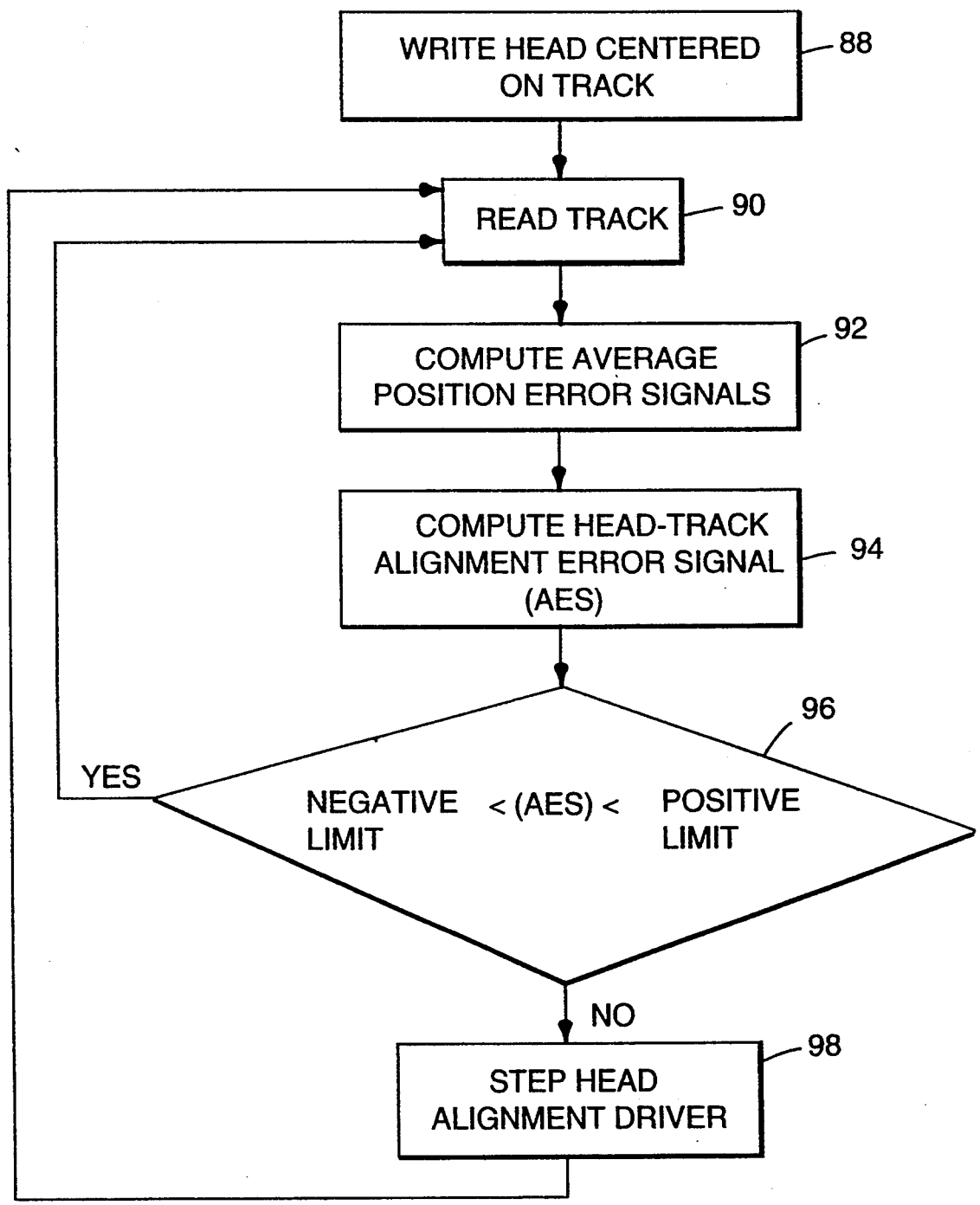
FIG. 2 is a flow chart representing the preferred head-track alignment method.

Head-track alignment by the system shown in FIG. 1 is performed preferably according to the method shown in the flow chart of FIG. 2. Beginning with process block 88, write head 33 is substantially centered on servo track 31 using the fine and coarse head-track positioning methods described previously. As the tape moves past head assembly 26, signals from the servo track are generated by read heads 25,27 as indicated in process block 90.

Proceeding to process block 92, the signals are passed to servo processor 44. The servo processor computes position error signals for each head based on the signal values. The position error signals are averaged over a period of time for each head to give a first average position error signal PES(ave1) and a second average position error signal PES(ave2). Those skilled in the art can specify a length of time used for averaging which provides sufficient accuracy of control for the system. As indicated in process block 94, servo processor 44 then computes a head-track alignment error signal (AES) as the difference of PES(ave1) and PES(ave2).

The method next enters decision block 96, where the value of the AES is compared to preset threshold limits. If the AES value is within those limits, no head alignment adjustments are made and the method returns to process block 90 to repeat the sampling process. The threshold limits are determined based on the step resolution of stepper motor 40 used for head-track alignment, and the limit values are programmed into the servo processor control algorithm.

If the AES value is outside of the limits, the method moves to process block 98, where the servo processor computes instructions for head alignment driver 50 to operate stepper motor 40. To compute the drive instructions (the required number of steps and the direction of stepper motor operation), the servo processor evaluates the magnitude and sign of the AES according to the control algorithm. Those skilled in the art will appreciate that particular aspects of the head-track alignment system, such as track geometry, must be considered when specifying the control algorithm.

Once the drive instructions are sent to the head alignment driver, the method returns to process block 90 to repeat the sampling process.

Referring again to FIG. 1, stepper motor 40 responds to the head alignment driver in a conventional manner to rotate lead screw 38 in small incremental amounts. Lead screw 38 in turn moves shaft follower 39 to which it is threaded. The shaft follower, constrained from rotating, moves either toward or away from the stepper motor. Support base 12, substantially attached to shaft follower 39 by spring 41 and rotatably fixed at the first end or other suitable location, follows the motion of the shaft follower and pivots through a small angle with respect to drive chassis 14, causing the head assembly 26 mounted thereon to pivot correspondingly.

Further head-track positioning control may be necessary to move the head assembly transversely, since pivoting the head assembly may tend to cause the common line to deviate from a centered position on the track. The servo loop control continues until the head-track alignment error signal and the head-track position error signal are essentially zero, indicating that head assembly 26 has been aligned and positioned so that both read heads are centered on the servo track.

Figure 3:
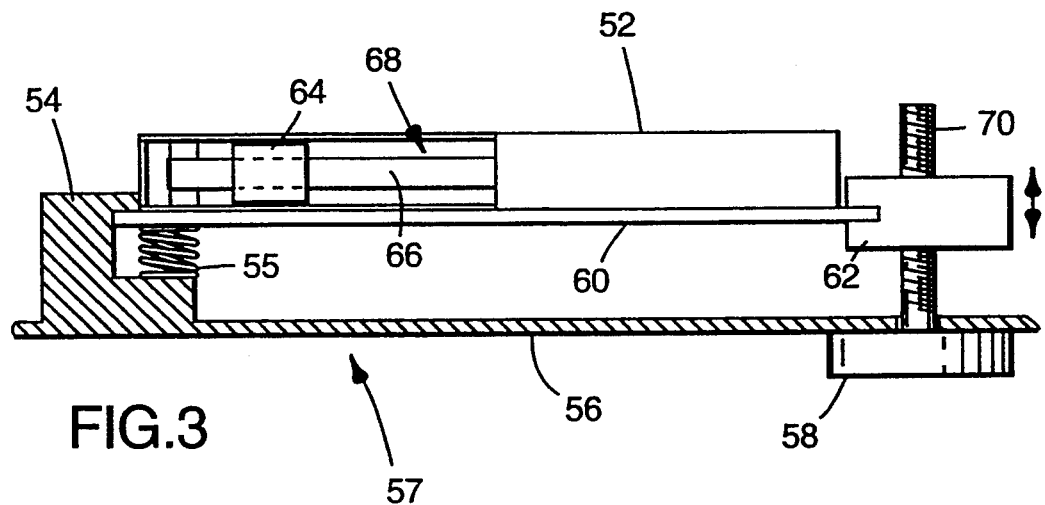
FIG. 3 is a schematic view of a tape cartridge in a drive according to one embodiment of the invention.

FIG. 3 illustrates another embodiment of the invention in which the plane of a self-contained tape cartridge is adjusted to achieve head-tape alignment.

Tape cartridge 52 has two major sides, one side consisting of a rigid baseplate 60. The cartridge also has two hubs for tape supply and takeup (not shown) and a window 68 to give head assembly 64 access to a magnetic tape 66 inside the cartridge.

The cartridge, shown inside a magnetic tape drive 57, is restrained at one end by bracket 54 mounted to drive chassis 56. A spring 55 or other known bias means is attached to the bracket to position the cartridge controllably. A stepper motor 58 is mounted to drive chassis 56 so that a lead screw 70 extends through an aperture in the chassis toward the tape cartridge. A shaft follower 62 is coupled to lead screw 70. The shaft follower engages a second end of tape cartridge 52 opposite the restrained end so as to constrain the shaft follower from rotating. A channel in the shaft follower into which baseplate 60 is inserted is one of several known means of constraint which may be used.

When tape cartridge 52 is inserted in the drive, one end of the cartridge is engaged along its edge by bracket 54 using spring 55 to restrain motion of the cartridge except for slight rotation about an axis parallel to the restrained edge. During operation of the drive, magnetic tape 66 moves past head assembly 64 so that one or more read heads (not shown) may generate signals from a servo track (not shown) on the tape. To correct misalignment between the servo track and head assembly, stepper motor 58 operates conventionally to rotate lead screw 70 in incremental steps. Shaft follower 62, constrained from rotating, moves either toward or away from the stepper motor, displacing the end of tape cartridge 52 which it engages. The entire cartridge pivots slightly around the restrained edge, allowing the servo track of magnetic tape 66 contained therein to be aligned with respect to magnetic head assembly 64. Other types of controlled displacement devices known in the art may be used in place of the stepper motor to achieve the same results, such as a piezoelectric crystal, a voice coil motor, or the like.

Figure 4:
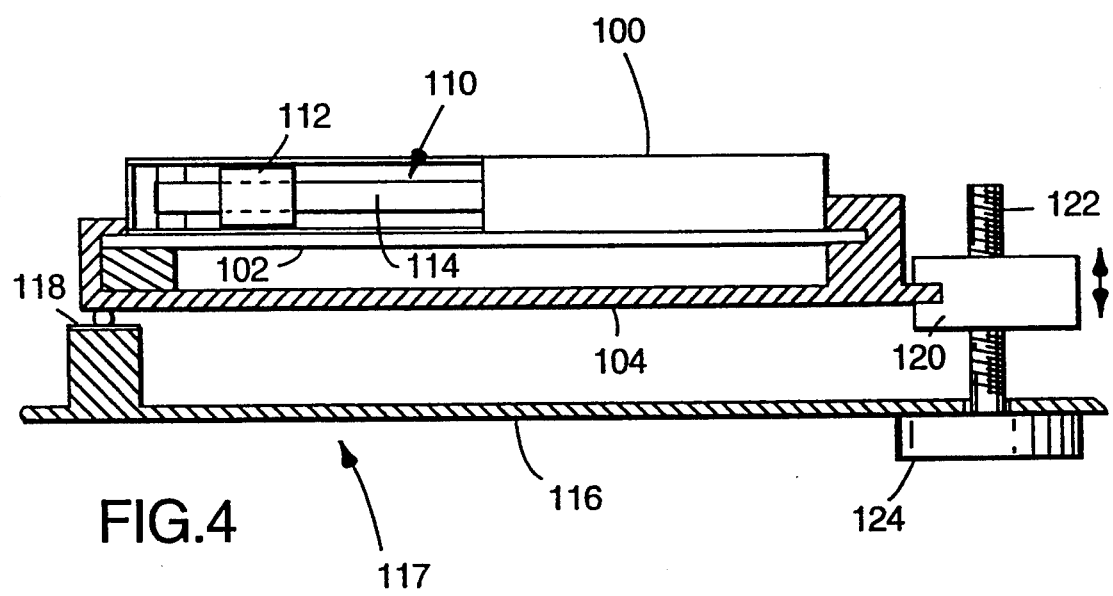
FIG. 4 is a schematic view of a tape cartridge in a drive according to another embodiment of the invention.

FIG. 4 illustrates another embodiment of the invention pertaining to the adjustment of a self-contained tape cartridge to achieve head-tape alignment. A tape cartridge 100 has two major sides, one side consisting of a rigid baseplate 102. The cartridge has a window 110 to give a head assembly 112 access to a magnetic tape 114 inside the cartridge.

The cartridge, shown inside a magnetic tape drive 117, is fixedly attached to a cartridge receiver plate 104 so that the plane of the cartridge and the plane of the receiver plate are substantially parallel. The cartridge can be attached to the receiver plate using a locking mechanism commonly found in magnetic tape drives in the art. The receiver plate is rotatably fixed to drive chassis 116 using a hinge 118 at a first end of the plate. Other rotatable means may be used instead for fixing the receiver plate.

The receiver plate is engaged at a second end by shaft follower 120 so that the shaft follower is constrained from rotating. A channel in the shaft follower into which receiver plate 104 is inserted, as shown in FIG. 4, is one of several known means of constraint which may be used. The shaft follower is coupled to lead screw 122 which extends through an aperture in drive chassis 116. The lead screw is coupled to a stepper motor 124 mounted to drive chassis 116.

When tape cartridge 100 is inserted in the drive, the cartridge is locked into place on the cartridge receiver plate using the locking mechanism generally found in currently available tape drives. During operation of the drive, magnetic tape 114 moves past head assembly 112 so that one or more read heads (not shown) may generate signals from a servo track (not shown) on the tape. To correct misalignment between the servo track and head assembly, stepper motor 124 operates conventionally to rotate lead screw 122 in incremental steps. Shaft follower 120, constrained from rotating, moves either toward or away from the stepper motor, displacing the end of the receiver plate which it engages. The receiver plate pivots slightly around its hinged end. The cartridge locked on the receiver plate pivots also, allowing the servo track of magnetic tape 114 contained therein to be aligned with respect to magnetic head assembly 112.

Either of the previous two embodiments shown in FIGS. 3 and 4 may be included in a servo control loop to provide dynamic head-track alignment in a similar manner as that described for the preferred embodiment of FIG. 1.

Figure 5:
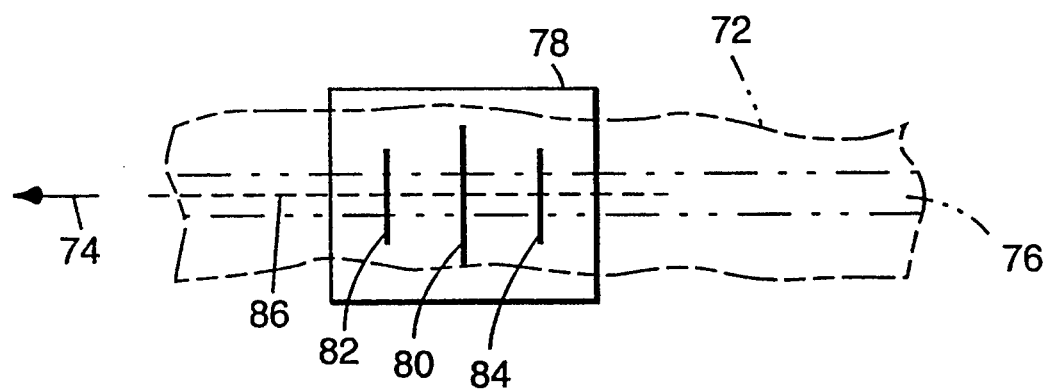
FIGS. 5, 6, and 7 are exemplary views of a section of magnetic tape extending along a transport path and having a single channel head assembly superimposed.

FIG. 5 pictorially illustrates a section of magnetic tape 72 in a tape cartridge. The tape follows a transport path 74 and has a recorded servo track 76. An exemplary magnetic head assembly 78 is shown superimposed over tape 72. In the head assembly, a write head 80 is located between a read head 82 and a read head 84 so that all three heads are substantially centered on a common line 86. As is known in the art, the tape traverses between two guides while a read or write operation is in progress. Ideally, as shown in FIG. 5, the tape travels along a path substantially parallel to common line 86. In this situation, both read heads 82, 84 are centered on servo track 76 and generate position error signals that are essentially equal.

Figure 6:
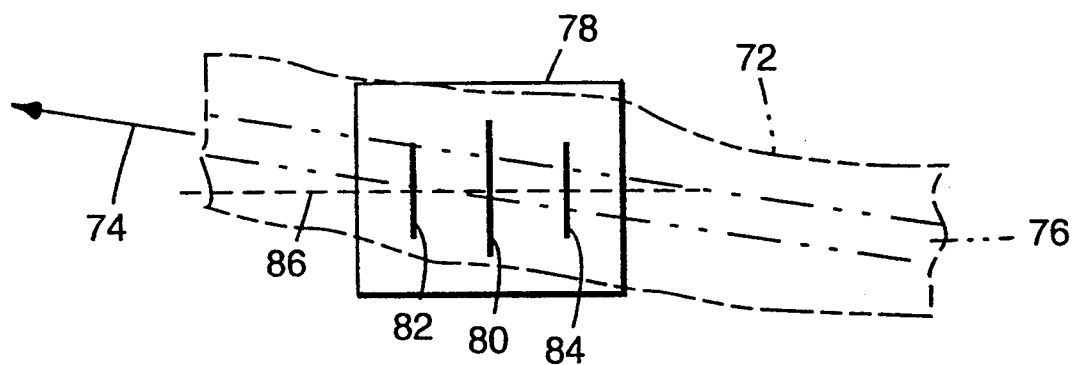

More often, however, tape 72 may be skewed with respect to head assembly 78. This skew is shown to an exaggerated degree in FIG. 6. Because common line 86 of head assembly 78 is not substantially parallel to servo track 76, read head 82 is displaced from the center of the servo track. The position error signal derived from this read head is significantly different from the position error signal derived from read head 84 which is still substantially centered on the track.

Figure 7:
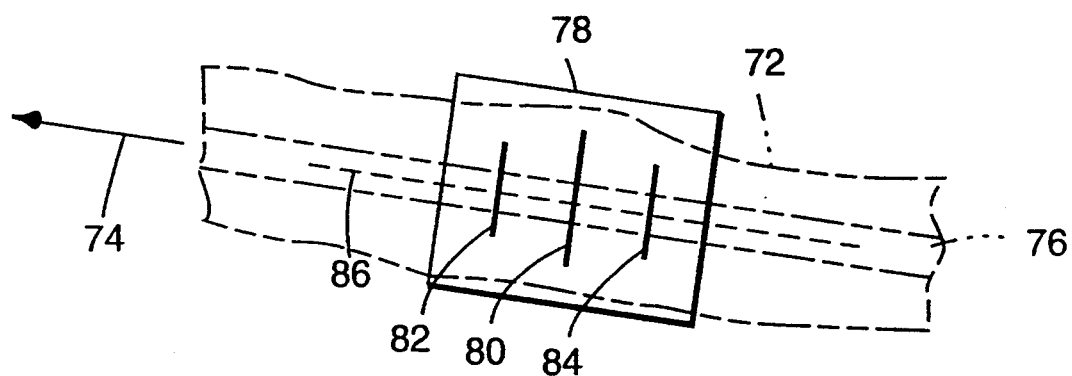

To compensate for this misalignment according to the preferred embodiment of this invention, head assembly 78 is pivoted so that common line 86 is once again aligned with servo track 76, as shown in FIG. 7. Read heads 82, 84 are once again centered over servo track 76.

It is also to be understood that other modifications could be made and that all such modifications falling within the spirit and scope of the appended claims are intended to be included in the present invention.

What is claimed is:

1. A magnetic recording head-track orienting assembly comprising:
    a multichannel head assembly having at least two read heads positioned along a common line for a given channel so that both heads are able to read from a single servo track recorded on a magnetic tape transported along a transport path, the servo track being substantially parallel to said transport path, and both heads being capable of generating signals simultaneously which are characteristic of the transverse position of each head relative to said servo track, and
    means responsive to said signals for orienting said head assembly with respect to said servo track so as to cause said common line and said servo track to be substantially parallel.

2. The head-track orienting assembly of claim 1, wherein said orienting means comprises a means for pivoting said head assembly about an axis substantially perpendicular to the plane of said magnetic tape.

3. The head-track orienting assembly of claim 2, wherein said pivoting means comprises:
    a support base on which said head assembly is mounted, said support base adapted to be rotatably mounted to the chassis of a magnetic tape drive, and
    means for producing controllable displacement of said support base, thereby enabling said head assembly to be pivoted.

4. The head-track orienting assembly of claim 3, wherein said displacement means comprises:
    a stepper motor adapted to be secured to said chassis, having a lead screw extending through an aperture in said support base,
    a threaded shaft follower substantially attached to said support base and coupled to said lead screw, and
    means for constraining said shaft follower from rotation.

5. The head-track orienting assembly of claim 4, further comprising means for positioning said head assembly so as to substantially center said common line on said servo track, including:
    means for coarse positioning of said head assembly along a line perpendicular to said servo track, and
    means for fine positioning of said head assembly so as to maintain a centered position of said read heads with respect to said servo track.

6. The head-track orienting assembly of claim 5, wherein said coarse positioning means comprises:
    a stepper motor,
    a lead screw driven by said stepper motor,
    a cylindrical shaft fixedly attached to said support base,
    a head mounting slide slidably mounted on said cylindrical shaft having a threaded portion engaging said lead screw, and
    a head mounting member mounted to said head mounting slide, said head assembly being rigidly mounted on said head mounting member.

7. The head-track orienting assembly of claim 5, wherein said fine positioning means comprises:
    a voice coil motor assembly attached to said head mounting member, and
    a pair of cantilevered leaf springs, each having a first and second end, arranged parallel to each other and vertically spaced apart by a distance appropriate to be flexibly engaged between said head mounting member and said head mounting slide, thereby allowing movement of said head assembly in a direction perpendicular to said servo track in response to said voice coil motor assembly.

8. The head-track orienting assembly of claim 1, wherein said read heads include two read heads positioned on either side of a write head so that all heads are substantially centered on said common line.

9. The head-track orienting assembly of claim 1, wherein said head assembly is attached to a head mounting slide by a pair of parallel cantilevered leaf springs and said pivoting means comprises means for producing controllable rotational flexion of said leaf springs.

10. The head-track orienting assembly of claim 1 for use with a magnetic tape cartridge having the transport path contained substantially within the cartridge, wherein said orienting means comprises means for controllably tilting the magnetic tape cartridge.

11. The head-track orienting assembly of claim 10, wherein said tilting means comprises:
    means for rotatably restraining a first end of the tape cartridge upon insertion of the cartridge in a magnetic tape drive,
    a stepper motor adapted to be secured to a drive chassis having a lead screw extending toward the tape cartridge, and a threaded shaft follower coupled to said lead screw, said shaft follower being constrained from rotating and engaging a second end of said tape cartridge.

12. The head-track orienting assembly of claim 10, wherein said tilting means comprises:
   a cartridge receiving plate inside a magnetic tape drive to which said tape cartridge is fixedly attached upon insertion in said drive, said cartridge receiving plate having a first end rotatably mounted to said drive,
   a stepper motor adapted to be secured to a drive chassis having a lead screw extending toward the cartridge receiving plate, and
   a threaded shaft follower coupled to said lead screw, said shaft follower being constrained from rotating and engaging a second end of said cartridge receiving plate.

13. A head-track orienting system for a magnetic recording tape drive using a tape having a servo track recorded thereon, said system comprising:
   a multichannel head assembly having at least two read heads positioned along a common line for a given channel so that both heads are able to read from a single servo track recorded on a magnetic tape transported along a transport path, the servo track being substantially parallel to said transport path, and both heads being capable of generating signals simultaneously which are characteristic of the transverse position of each head relative to said servo track,
   means for transporting said tape past said head assembly along said transport path,
   at least a pair of amplifiers for amplifying the signals generated by the read heads,
   means for computing position error signals based on the signals generated by the read heads,
   means for computing a head-track alignment error signal based on said position error signals, and
   means responsive to said head-track alignment error signal for orienting said head assembly with respect to the servo track so as to minimize a difference between said position error signals, thereby causing the common line and the servo track to be substantially parallel.

14. The head-track orienting system of claim 13, wherein said orienting means comprises a means for pivoting said head assembly about an axis substantially perpendicular to the plane of said magnetic tape.

15. The head-track orienting system of claim 14, wherein said pivoting means comprises:
   a support base on which said head assembly is mounted, said support base adapted to be rotatably mounted to the chassis of a magnetic tape drive, and
   means for producing controllable displacement of said support base, thereby enabling said head assembly to be pivoted.

16. The head-track orienting system of claim 15, wherein said pivoting means further comprises a head alignment driver to cause said displacement means to respond to said head-track alignment error signal.

17. The head-track orienting system of claim 15, wherein said displacement means comprises:
   a stepper motor adapted to be secured to said chassis, having a lead screw extending through an aperture in said support base,
   a threaded shaft follower substantially attached to said support base and coupled to said lead screw, and
   means for constraining said shaft follower from rotation.

18. The head-track orienting system of claim 13, further comprising means for positioning said head assembly so as to minimize the magnitude of said position error signals, thereby substantially centering said common line on said servo track, including:
   means for computing a head-track position error signal from the position error signals received from the amplifiers,
   means responsive to said head-track position error signal for coarse positioning of said head assembly along a line perpendicular to said servo track, and
   means responsive to said head-track position error signal for fine positioning of said head assembly so as to maintain a centered position of said read heads with respect to said servo track.

19. The head-track orienting system of claim 18, wherein said coarse positioning means comprises:
   a stepper motor,
   a lead screw driven by said stepper motor,
   a cylindrical shaft fixedly attached to said support base,
   a head mounting slide slidably mounted on said cylindrical shaft having a threaded portion connecting to said lead screw, and
   a head mounting member mounted to said head mounting slide, said head assembly being rigidly mounted on said head mounting member.

20. The head-track orienting system of claim 18, wherein said coarse positioning means further comprises a coarse position driver to cause said stepper motor to respond to said head-track position error signal.

21. The head-track orienting system of claim 18, wherein said fine positioning means comprises:
   a voice coil motor assembly attached to said head mounting member, and
   a pair of cantilevered leaf springs, each having a first and second end, arranged parallel to each other and vertically spaced apart by a distance appropriate to be flexibly engaged between said head mounting member and said head mounting slide, thereby allowing movement of said head assembly in a direction perpendicular to said servo track in response to said voice coil motor assembly.

22. The head-track orienting system of claim 18, wherein said fine positioning means further comprises a fine position driver to cause said voice coil motor assembly to respond to said head-track position error signal.

23. The head-track orienting system of claim 13, wherein said computing means comprises a programmed servo processor.

24. A head-track alignment method for a magnetic recording tape drive wherein said tape drive comprises at least one multichannel head assembly with at least two read heads per channel, drive electronics responsive to a head-track alignment error signal, and a displacement transducer for controllably pivoting said head assembly, said head-track alignment method comprising the steps of:
   a) moving a magnetic tape along a transport path within said tape drive, b) reading a recorded servo track on said tape with said two read heads operating simultaneously to generate signals characteristic of the transverse position of each head relative to said servo track, said servo track being substantially parallel to said transport path, c) deriving position error signals from said signals generated by each read head, d) deriving a head-track alignment error signal by computing the difference between said position error signals, and e) operating said displacement transducer in response to said head-track alignment error signal to pivot said head assembly so as to minimize said head-track alignment error signal.

* * * * *